United States Patent [19]

Arimilli et al.

[11] Patent Number: 5,491,811
[45] Date of Patent: Feb. 13, 1996

[54] CACHE SYSTEM USING MASK BITS TO RECORDER THE SEQUENCES FOR TRANSFERS OF DATA THROUGH CACHE TO SYSTEM MEMORY

[75] Inventors: Ravi K. Arimilli, Round Rock; Sudhir Dhawan; David W. Siegel, both of Austin, all of Tex.

[73] Assignee: International Business Machines Corporation, Armonk, N.Y.

[21] Appl. No.: 871,322

[22] Filed: Apr. 20, 1992

[51] Int. Cl.⁶ .................................................. G06F 13/00
[52] U.S. Cl. ..................... 395/471; 395/482; 395/872; 364/242.3; 364/242.31; 364/243.41; 364/252.5; 364/259.7; 364/967.4; 364/958.2; 364/964.6; 364/DIG. 1; 364/DIG. 2
[58] Field of Search ...................... 395/425; 364/252.3, 364/252.5, 947.4, 958, 958.2, 958.3, 242.3, 242.31, 243.41, 259.7, 964.6

[56] References Cited

U.S. PATENT DOCUMENTS

| | | | |
|---|---|---|---|
| 4,520,439 | 5/1985 | Liepa | 395/425 |
| 4,719,568 | 1/1988 | Carrubba et al. | 364/200 |
| 4,797,813 | 1/1989 | Igarashi | 395/425 |
| 4,835,678 | 5/1989 | Kofuji | 395/425 |
| 5,057,837 | 10/1991 | Colwell et al. | 341/55 |
| 5,146,573 | 9/1992 | Sato et al. | 395/425 |
| 5,155,824 | 10/1992 | Edenfeld et al. | 395/425 |
| 5,163,142 | 11/1992 | Mageau | 395/425 |
| 5,185,875 | 2/1993 | Chinnaswamy et al. | 395/425 |
| 5,193,167 | 3/1993 | Sites et al. | 395/425 |
| 5,202,969 | 4/1993 | Sato et al. | 395/425 |
| 5,263,142 | 11/1993 | Watkins et al. | 395/425 |
| 5,263,144 | 11/1993 | Zurawski et al. | 395/425 |
| 5,276,851 | 1/1994 | Thacker et al. | 395/425 |

FOREIGN PATENT DOCUMENTS

| | | |
|---|---|---|
| 0159713 | 4/1984 | European Pat. Off. . |
| 0167089 | 6/1984 | European Pat. Off. . |
| 02-98754 | 4/1990 | Japan . |

OTHER PUBLICATIONS

IBM Technical Disclosure Bulletin, vol. 31, No. 9, Feb. 89, Improving Operational Performance of Cache Memories—"Proper Handling of Store Misses in Write–In Caches", pp. 92–93.

Digest of Papers, Computer Society International Conference (Compcon85): "The Convex C–1 64–bit Supercomputer", Steve Wallach, 25, Feb. 85, San Francisco, CA; US pp. 122–126.

IBM Technical Disclosure Bulletin, vol. 31, No. 12, May 1989, pp. 281–282.

Primary Examiner—Tod R. Swann
Assistant Examiner—Frank J. Asta
Attorney, Agent, or Firm—Mark E. McBurney; Cas Salys; Andrew J. Dillon

[57] ABSTRACT

Apparatus and method for improving the rate of transfer of data in the context of a system memory operated in conjunction with a cache. In one form, mask bits in a mask bit register are associated to bytes of cache. The mask bits are changed in state when the corresponding byte in the cache is written. The mask bits are used in a reordered operating sequence to selectively write data from system memory into the cache after a write into cache. Data transfer performance is improved significantly in that the selective writing of data from system memory to cache can be completely eliminated when the mask bits indicate that a whole unit of the cache, typically a cache line, has been written during the data transfer into the cache.

8 Claims, 3 Drawing Sheets

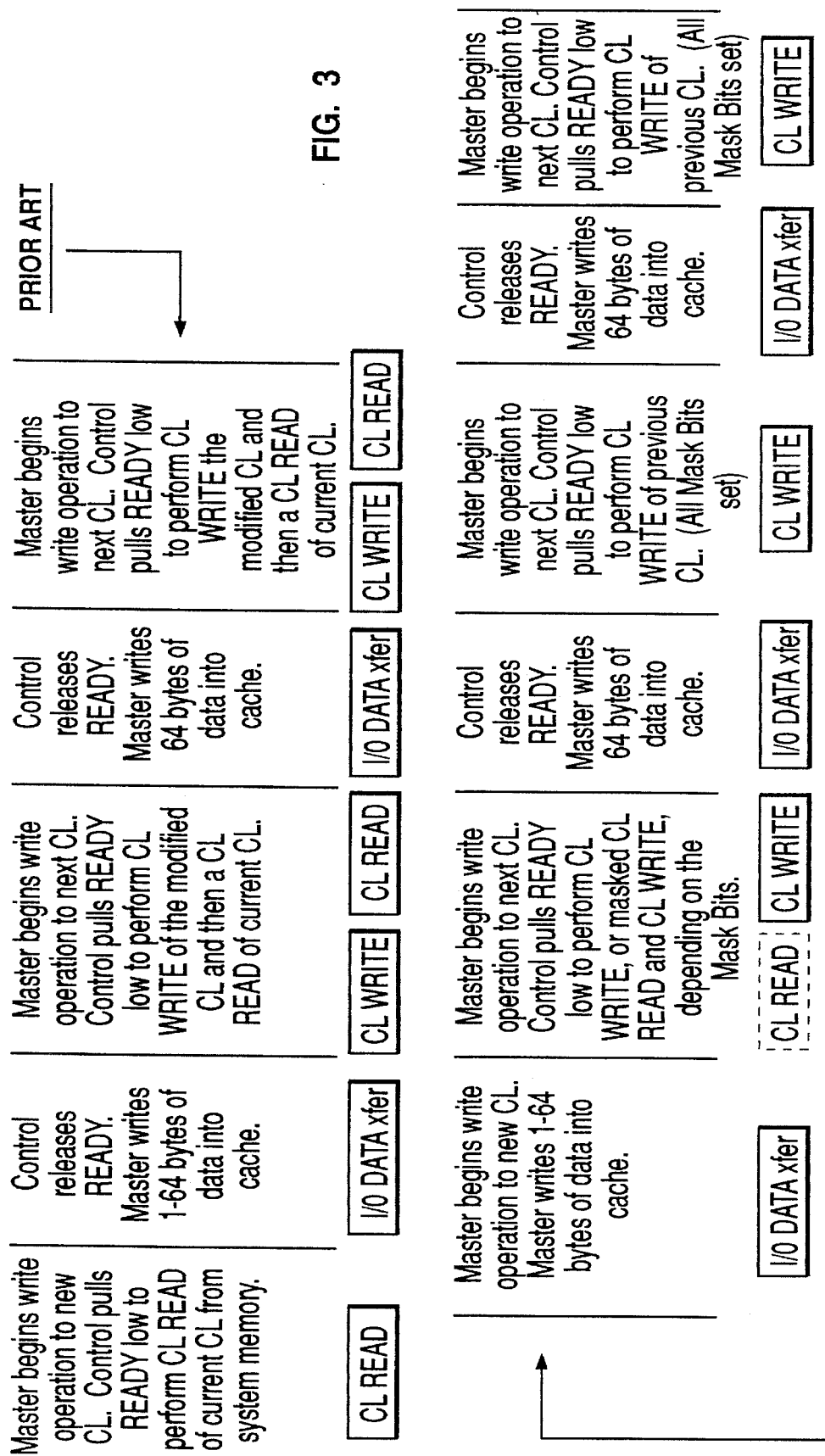

CACHE SYSTEM USING MASK BITS TO RECORDER THE SEQUENCES FOR TRANSFERS OF DATA THROUGH CACHE TO SYSTEM MEMORY

BACKGROUND OF THE INVENTION

The present invention relates generally to computer architectures and operational processes. More particularly, the invention is directed to systems and methods for performing non-predictive pattern data transfers in the context of a computer architecture utilizing a data cache and a system memory.

Contemporary designs of workstation computers utilize architectures which include one or more high speed cache type memories. Such cache memories are used to offset the effects of the relational low speed system memories. U.S. Pat. No. 4,719,568 describes the structure and use of a now classic workstation employing cache memories for both data and instructions.

It is also common for contemporary workstations to be architected with multiple buses, the prevailing practice including both a system bus and an input-output (I/O) bus. The I/O bus communicates information between the workstation and units functionally external to the workstation. A well known example of an I/O bus is the Micro Channel* bus which appears in the Personal System/2* and RISC System/6000* product lines available from IBM Corporation. The Micro Channel bus employs a bus master/slave protocol which is also widely understood and utilized.

*Trademark of IBM Corporation

Another aspect of such conventional workstation architectures involves the prevalent use of direct memory access (DMA) resources. DMA enables direct data transfers between the I/O bus and the system memory, thereby avoiding the transfer of each data word through the processor. DMA practices are well known by those skilled in computer technologies.

Data integrity requires that any write operations ensure consistency between the corresponding data in cache and system memory. The preferred solution has involved the use of the cache as the access medium for write operations. Thus, all write type transfers of data to system memory are through the cache memory, ensuring data correspondence.

The size of the block of data written to a cache, whether that be from the I/O bus to an I/O cache by the DMA resources or directly from the processor to the processor cache, is not predictable. Therefore, the data to be transferred may or may not fill the whole transfer unit of the cache during any one transfer cycle. Given such unpredictability and the pervasive need for data integrity, common practice involves a transfer sequence beginning with a read of preexisting data from system memory into the cache, followed by a selective write of the modifying data into the cache, and concluded with a transfer of the composite data from cache back to the system memory. The last step is usually deferred until a cache miss occurs during a succeeding data write cycle. Thereby, irrespective of how much cache data changes as a consequence of the cache write cycle, the unchanged portion of the data unit in the cache, typically a cache line, must be returned to system memory as originally stored in system memory during the eventual cache line write to system memory cycle.

The practice of reading a cache line of data from system memory into the cache, writing data changes into the cache by a processor or DMA resources, and the eventual transfer of the composite cache line data back to system memory is slow. Reading from system memory prior to writing into cache is particularly undesirable, in that the read of the system memory RAM is significantly slower than a corresponding write operation. Furthermore, the succession of a write operation from cache to the system,memory followed immediately by a system memory read operation, for the next cache line, monopolizes the high speed system bus for relatively long intervals of time.

In the context of a computer architecture having both cache and system memory functions, there remains a need for a system and method by which non-predictive pattern data transfers to cache can be accomplished without compromising the data integrity or unduly monopolizing the processor bus.

SUMMARY OF THE INVENTION

According to the present invention, improved rates of data transfer are obtained while providing full system memory and cache data integrity. Mask bits are created in association with blocks of data in the cache. Such masking bits allow the reordering of the transfer sequence. For data write operations in which the data completely fill the cache line, the system memory read cycle is completely eliminated. In partial cache line write situations, the extent of system memory data read is reduced to that fraction of the cache line not written.

The invention defines a system, and related method, for controlling the transfer of data into system memory through a cache, and comprises a bus connecting a system memory to a cache; a means for transferring a non-predictive pattern of data into the cache; means for relating mask bits to selected groupings of bits in the cache; and means for selectively transferring data into system memory in response to the states of the mask bits.

In a preferred practice of the invention, mask bits are assigned to each byte of data in a cache line of an I/O cache within a DMA resource. DMA transfers of data from an I/O bus to the I/O cache are monitored to identify which bytes are actually written into the cache line. The mask bits associated with affected bytes are changed in state accordingly. Following the transfer of each complete line, e.g. 64 bytes, the 64 related mask bits reflect by byte the extent of the cache line written. If the whole cache line has been written by the DMA cycle, the data now in the cache line can be written without delay into system memory. On the other hand, if the mask bits indicate that the cache line was only partially written, a supplemental read of system memory is initiated for the cache line bytes identified by the mask bits which have not been changed. Thereby, the data integrity as reflected by full cache line remains intact. The cache line data write to system memory cycle usually follows a cache line miss. In the alternative, it is also possible to write data from selected cache line bytes into system memory, as defined by the mask bits reflecting a change. This sequence is less likely given that most systems transfer data by cache line rather than individual byte units.

These and other features of the invention will be more clearly understood and appreciated upon considering the detailed description which follows.

BRIEF DESCRIPTION OF THE DRAWINGS

FIG. 3 is a schematic diagram contrasting the steps of the present method with prior practices.

DESCRIPTION OF A PREFERRED EMBODIMENT

Figure 1:
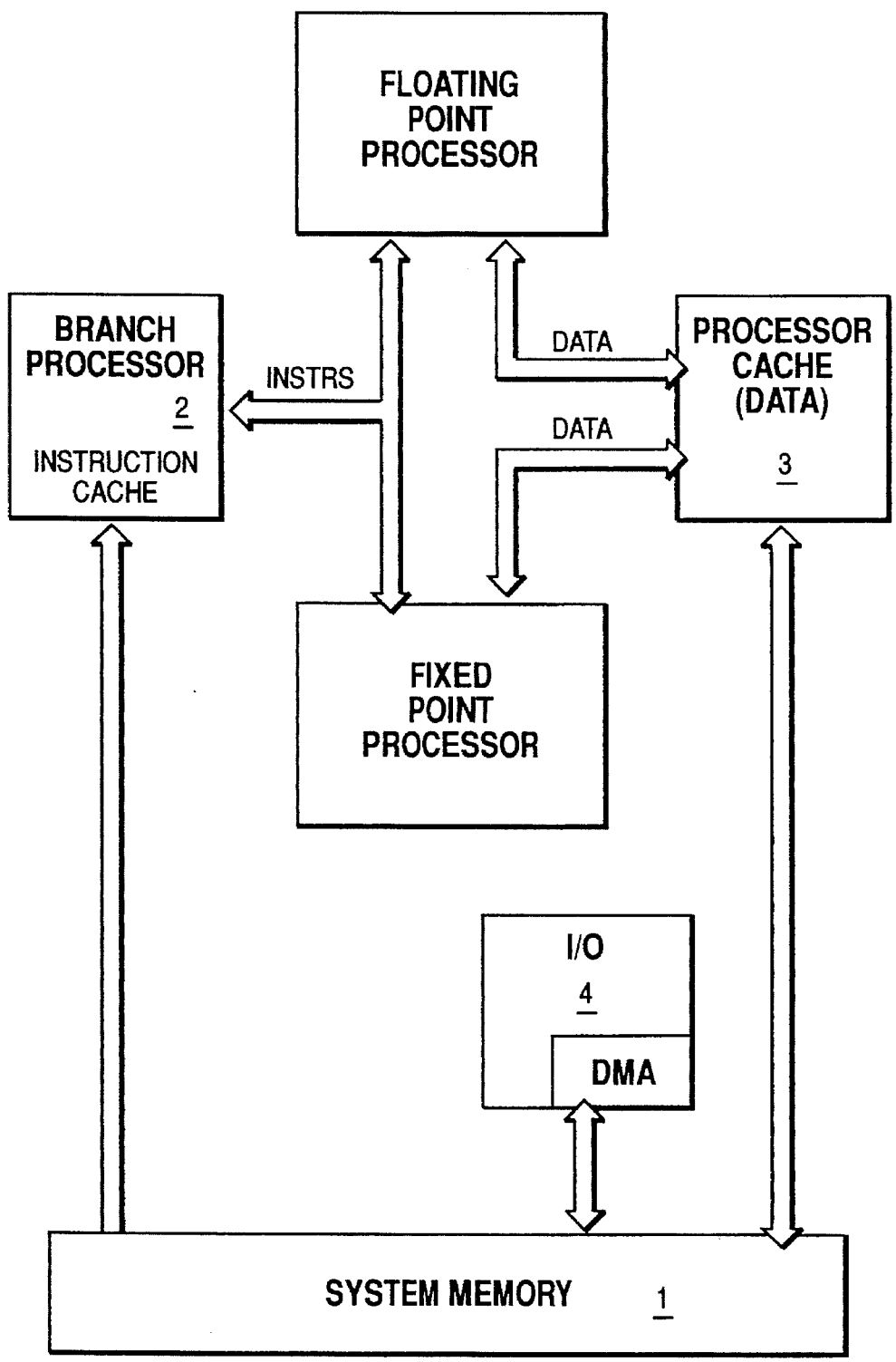
FIG. 1 schematically depicts a high level representation of the computer system architecture to which the press invention pertains.

FIG. 1 illustrates by high level schematic the functional architecture of a contemporary workstation class computer. A representative commercially available unit is the RISC System/6000™ produced by IBM Corporation. In general, system memory 1 communicates with branch processor 2, communicates with processor cache 3, and communicates with I/O 4. Communication between the devices in I/O 4 and system memory 1 is accomplished through a direct memory access (DMA) resource, the particulars of which are well understood by those practicing within the technology.

Figure 2:
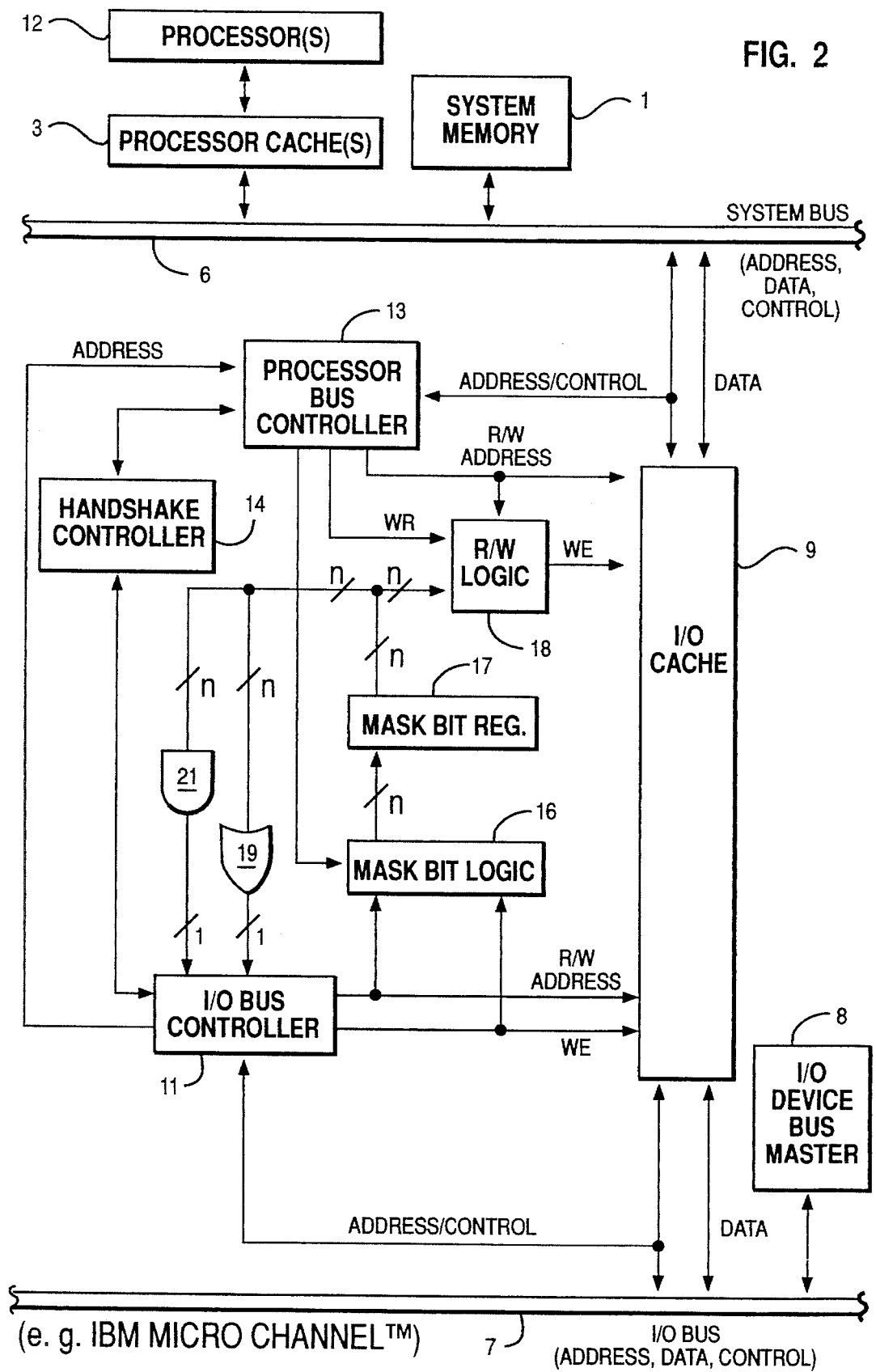
FIG. 2 presents a schematic block diagram of an embodying DMA implementation of the invention.

The structural schematic of an embodying computer architecture, as appears in FIG. 2, differs somewhat from the functional depiction of FIG. 1 in that the isolation of system bus 6 from I/O bus 7 becomes definitive. The DMA resource is integral to the blocks which accomplish the transfer of data from I/O bus 7 into system memory 1 in the manner defined by the present invention. Central to the architecture and context of the invention is I/O cache 9. Though schematically shown in a dual port configuration to simplify the understanding of its functional relationship to system bus 6 and I/O bus 7, I/O cache 9 is expected to be of a conventional single port high speed RAM configuration.

The computer architecture in FIG. 2 depicts I/O device 8 as a bus master on I/O bus 7, and such defines that I/O bus controller 11 assumes a slave mode of operation. Thus, I/O bus controller 11 manages I/O cache 9 as a slave on I/O bus 7 in a matter analogous to the well known operation of the Micro Channel Interface Controller for the Micro Channel™ bus. FIG. 2 also shows processor bus controller 13 and handshake controller 14, the latter serving to coordinate the operations of bus controllers 11 and 13.

The use of mask bits per se is not novel. For example, such bits are used in U.S. Pat. No. 4,719,568 to control cache lines, in U.S. Pat. No. 5,057,837 to identify zero data fields during compression of instruction words, in Japanese Patent Application No. 63-250760 to selectively partition a cache, and in IBM Technical Disclosure Bulletin, Vol. 31, No. 12, May 1989, pages 281 and 282 to selectively gate data during a DMA cycle. However, the references do not address any use of masking in the context of non-predictive pattern cache writing to reorder conventional read/modify/write operations, to retain data integrity, and to maximize data transfer rates.

FIG. 3 compares representative sequences of operation to write a block of data from a bus master residing on the I/O bus to a system memory residing on the bus in the context of a processor data cache. The comparison of operations in FIG. 3 presents the prior art practice at the top and the post-demand memory access practice, according to the present invention, immediately below.

Consider the procedures defined by the prior art first. When the bus master commences a write operation to a new cache line in progression to the system memory, the cache controller first initiates a cache line read of system memory into the cache. This is done because the bus master DMA operation is non-predictive, such that the block of I/O data subject to the DMA transfer can begin or finish with any byte in a cache line. This requires that the remainder of any such cache line reflect and match the data originally in system memory. The master then writes 1–64 bytes of data into the cache line following conventional practices. Thereafter, or upon the next successive cache miss, the cache line just completed is written to system memory and a cache line read of the next successive cache line from system memory is undertaken. As shown in FIG. 3, this procedure is repeated for each cache line. Namely, a cache line is read from system memory to the cache, the cache line in each is modified by the I/O data from the bus master, and then the cache line from cache is written into system memory. This order of operation ensures that the system memory and cache are consistent.

According to the preferred practice of the invention, a set of mask bits is created and associated with each specific byte of data in a 64 byte long I/O cache line. The mask bits are used in a reordered sequence of the data transfer operations between the I/O bus master to the system memory. This new order of operation is descriptively identified as the post-demand memory access sequence in FIG. 3. According to such operation, a complete cache line of I/O data is transferred from the bus master to the I/O cache. A mask bit associated with a byte in the I/O cache line is changed in state if the corresponding byte in the cache line is written during the transfer. The mask bits define whether all or part of the cache line bytes have been written. An interrogation of the mask bits routinely follows a conventional cache line miss. If the whole cache line has been subject to a write operation, the I/O cache line is written into system memory upon the next cache line miss without any intervening system memory read operation. On the other hand, if only some of the mask bits are changed in state, reflecting a partial cache line write, the mask bits are used to selectively define which bytes are to be masked during the cache line read from system memory. Thereby, the cache mask bits serve both to determine which bytes of data need to be transferred from system memory to the cache line and to establish when such system memory to cache write operation can be completely eliminated. As noted earlier, the reading of data from system memory into the cache is a relatively slow process. Though reading from system memory to cache is routinely performed in cache line units, the invention fully contemplates mask bit defined byte size transfers when the bus architecture is so configured.

In FIG. 2, the creation, storage and use of mask bits in relation to data in I/O cache 9 is accomplished in the combination of mask bit logic block 16, mask bit register 17, read/write logic block 18, n bit wide OR gate 19, and n bit wide AND gate 21. Data transfers are in cache line wide units. Mask bit logic 16 decodes the write addresses of the data transmitted by bus master I/O device 8 and generates byte related bits for mask bit register 17. Gate 19 determines when none of the bytes in I/O cache 9 have been modified, indicating that no action needs to be taken with references to system memory 1. Gate 21 determines when all the bytes in I/O cache 9 have been modified by the bus master. In the case when all n of the mask bits have been affected, the read cycle from system memory 1 is eliminated and the DMA operation is concluded with a cache line wide write from I/O cache 9 to system memory 1 upon the next cache line miss. Immediately thereafter, the mask bits are cleared. If only some of the mask bits have been modified in state, reflecting a corresponding byte written into data cache 9, processor bus controller 13 in combination with read/write logic 18 selectively enables the byte positions having unmodified bit states. Once such selective reading from system memory 1 to data cache 9 is completed, and a cache line miss occurs, the cache line in data cache 9 is transferred to system memory 1 and mask bit logic 16 is reset by processor bus controller 13 for the next successive transfer of a cache line of data from I/O device 8.

The flexibility of the architecture embodied in FIG. 2 is multifaceted. First, it minimizes the read of data from system memory to I/O cache during transfers of data from an I/O bus master. This is accomplished by either completely eliminating of the read cycle, when the mask bits reflect that complete cache line has been modified, or reducing the duration of the read cycle to a minimum fraction of the cache line. Furthermore, if a purported transfer of data from the I/O device does not result in an actual writing of a cache line, the associated reading from system memory is eliminated.

The use of mask bits to eliminate system memory read cycles in a reordered sequence of data transfers through a cache has proven to be particularly valuable, in that most blocks of DMA data are significantly larger than a single cache line. Thus, the larger the block of data the greater the gain provided by the invention. The scope of the invention should be recognized to extend to transfers other than between an I/O bus master device and a system memory, such as between processor 12 and system memory 1 via processor cache 3 with the operations being refined in an analogous manner.

Though the invention has been,described and illustrated by way of specific embodiment, the systems and methods encompassed by the invention should be interpreted consistent with the breath of the claims set forth hereafter.

We claim:

1. Apparatus for controlling a transfer of data involving a data cache and memory of a computer system, comprising:

a bus connecting the computer system memory and the computer system data cache;

means for transferring data into the computer system data cache;

at least one data unit in the computer system data cache, the at least one data unit comprising a plurality of groups of bits;

a plurality of mask bits, wherein each of the plurality of mask bits is associated with one of the plurality of groups of bits;

means for relating a given state of each of the plurality of mask bits bit to changes in the group of bits associated with that mask bit; and means for transferring data from the computer system memory to the computer system data cache in response to the given states of the plurality of mask bits.

2. The apparatus recited in claim 1, wherein the means for transferring data from the computer system memory to the computer system data cache eliminates a read from the computer system memory when the given state of each of the plurality of mask bits coincides with the given states of each of the other of the plurality of mask bits.

3. The apparatus recited in claim 2, wherein the means for transferring data from the computer system memory to the computer system data cache transfers data from the computer system memory to the computer system data cache selectively by groups of bits.

4. The apparatus recited in claim 4, wherein the at least one data unit comprises a cache line.

5. The apparatus recited in claim 4, wherein each Of the plurality of groups of bits comprises one byte.

6. A method of operating a computer system to perform a data transfer between a data cache of the computer system and a computer system memory, comprising the steps of:

transferring data into the computer system data cache, wherein the data comprises at least one data unit which comprises a plurality of groups of bits;

generating a plurality of mask bits, wherein each of the plurality of mask bits is associated with one of the plurality of groups of bits; and selectively transferring data from the computer system memory to the computer system data cache based upon given states of the plurality of mask bits.

7. The method recited in claim 6, wherein the at least one data unit comprises a cache line.

8. The method recited in claim 7, wherein each of the plurality of groups of bits comprises one byte.

* * * * *